United States Patent
Jameson et al.

(10) Patent No.: US 10,079,805 B2
(45) Date of Patent: Sep. 18, 2018

(54) BYPASSING A FIREWALL FOR AUTHORIZED FLOWS USING SOFTWARE DEFINED NETWORKING

(71) Applicant: FUJITSU LIMITED, Kawasaki-Shi, Kanagawa (JP)

(72) Inventors: David D. Jameson, Rowlett, TX (US); Russell DeMolay, Sachse, TX (US)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 15/181,123

(22) Filed: Jun. 13, 2016

(65) Prior Publication Data
US 2017/0359310 A1 Dec. 14, 2017

(51) Int. Cl.
*G06F 9/00* (2006.01)
*H04L 29/06* (2006.01)
(52) U.S. Cl.
CPC .... *H04L 63/0236* (2013.01); *H04L 2463/121* (2013.01)
(58) Field of Classification Search
CPC ...... H04L 63/0236; H04L 2463/121
USPC ......................................................... 726/13
See application file for complete search history.

(56) References Cited

U.S. PATENT DOCUMENTS

| 2007/0271362 A1* | 11/2007 | Bamnolker ......... H04L 63/0263 709/223 |
| 2017/0085459 A1* | 3/2017 | Xia ......................... H04L 43/12 |
| 2017/0324625 A1* | 11/2017 | Meirosu ................ H04L 43/026 |

OTHER PUBLICATIONS

Collings, Jake, et al., "An OpenFlow-based Prototype of SDN-Oriented Stateful Hardware Firewalls," IEEE 22nd International Conference on Network Protocols. pp. 525-528, 2014.

* cited by examiner

*Primary Examiner* — Anthony Brown
(74) *Attorney, Agent, or Firm* — Baker Botts L.L.P.

(57) ABSTRACT

Methods and systems for managing authorized data flows using software defined networking include receiving flow criteria sent from a firewall and extracted from a first data packet, determining whether flow criteria of the first data packet matches an entry in a master data flow list, inserting the flow criteria from the first data packet into the master data flow list on a software defined networking controller, and sending the flow criteria of the first data packet to the router. The router may forward a second data packet associated with the data flow toward a destination based on the validation of the first data packet by the firewall. The flow criteria may not match an entry in a router data flow list on the router and may include at least two of: a source IP address, a destination IP address, a destination port, and a protocol of transmission.

20 Claims, 8 Drawing Sheets

BYPASSING A FIREWALL FOR AUTHORIZED FLOWS USING SOFTWARE DEFINED NETWORKING

BACKGROUND

Field of the Disclosure

The present disclosure relates to communications systems and more specifically to bypassing a firewall for authorized flows using software-defined networking.

Description of the Related Art

As more applications are provided as networked services (referred to as "cloud applications") from data center infrastructure (referred to as "the cloud"), the cloud applications are executed on shared physical infrastructure and may be viewed as "tenants" in a multi-tenant cloud. For example, the cloud may represent distributed datacenter infrastructure that includes computing resources and intra-datacenter networks inside each datacenter, along with inter-datacenter optical networks connecting geographically dispersed datacenters. Virtualization of computing resources has emerged as a key technology for the cloud and may enable multiple tenants to efficiently share both computing and network resources.

Along with virtualization, software-based control of network services and functions has also become widespread using software controllers for implementing various network functionality. For example, software-defined networking (SDN) represents an important step towards network virtualization and abstraction and may allow for a logical network entity to be instantiated automatically using software instructions, rather than manually from user input. Due to complexities between software-based network control technologies and actual network provider operations, customization involved with each software controller may add complexity, cost, and delays for rolling out network services.

SUMMARY

In one aspect, a first method for managing authorized data flows using a software defined networking controller is disclosed. The first method may include receiving flow criteria at the software defined networking controller. The flow criteria may be extracted from a first data packet, and may include at least two of: a source IP address, a destination IP address, a destination port, and a protocol of transmission. The first data packet may not match an entry in a router data flow list on the router. The first method may include determining whether the flow criteria from the first data packet matches an entry in a master data flow list. The first method may include inserting the flow criteria from the first data packet into the master data flow list. The insertion may be based on the determination that the flow criteria does not match an entry. The first method may include sending the flow criteria of the first data packet from the software defined networking controller to the second router. The router may forward a second data packet associated with the data flow toward a destination based on the validation of the first data packet by a firewall.

In another aspect, a network for managing authorized data flows is disclosed. The network may include a router, a firewall, and a software defined networking controller. The router may include logic to receive a first packet and/or logic to determine whether the flow criteria matches an entry in the router data flow list. The flow criteria may include at least two of: a source IP address, a destination IP address, a destination port, and a protocol of transmission. The router may include logic to route the first data packet to the firewall. The firewall may include logic to validate the first data packet. The firewall may include logic to send the first data packet toward a destination and/or logic to send the flow criteria to the software defined networking controller. The software defined networking controller may include logic to determine whether the flow criteria matches an entry in a master data flow and/or logic to insert the flow criteria into the master data flow list based on the determination that the flow criteria does not match an entry. The software defined networking controller may include logic to send the flow criteria to the router. The router may forward the second data packet, which may be associated with the data flow, toward a client. The forwarding may be based on validation of the first data packet.

Additional disclosed aspects for managing authorized data flows include a system comprising a processor configured to access non-transitory computer readable memory media, an article of manufacture comprising non-transitory computer readable memory media storing processor-executable instructions, a network server and a network element for managing authorized data flows, as described herein.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF PARTICULAR EMBODIMENT(S)

Figure 1:
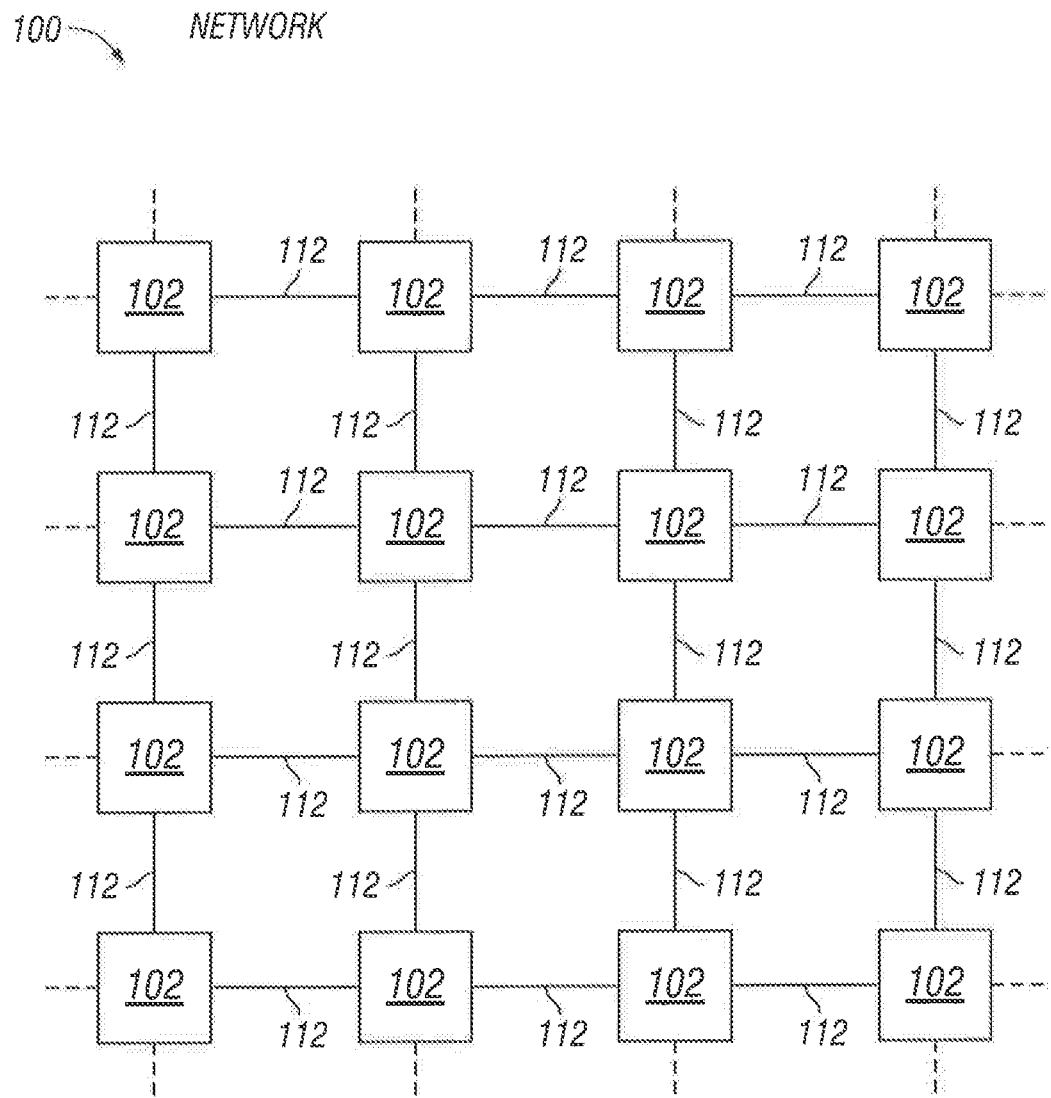
FIG. 1 is a block diagram of selected elements of an embodiment of a network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the unhyphenated form of the reference numeral refers to the collective element. Thus, for example, device "12-1" refers to an instance of a device class, which may be referred to collectively as devices "12" and any one of which may be referred to generically as a device "12".

As noted, software-based control of network services using software controllers for implementing various network functionalities may still involve a significant degree of customization. For example, each software defined networking controller may rely upon specific customization to handle service definitions for various standards, such as multiprotocol label switching (MPLS), virtual local area networks (VLAN), and network virtualization using generic routing encapsulation (NVGRE), among others. Examples of software control systems that implement software-based controllers or software controllers, include software-defined networking (SDN) and network function virtualization (NFV) managers. Examples of commercial SDN software controllers include 6WINDGate (6WIND USA, Inc.), Arista EOS (Arista Networks, Inc.), Brocade Vyatta (Brocade Communication Systems, Inc.), Cisco APIC (Cisco Systems, Inc.), and Juniper NorthStar (Juniper Networks, Inc.), among others. The customization of such software controllers with control logic for use by a network operator to fulfill service requirements and support existing network technologies may involve weeks or months of hard-coded software development, even for the most advanced or sophisticated software controllers.

Software control systems may enable the flexibility to implement solutions that may not have been possible without virtualization. This flexibility, however, may often result in less efficiency in virtualized solutions than non-virtualized or hardware counterparts. As a result, software control systems may not employ the same solutions or approaches as non-virtualized or hardware. Rather, software control systems may be optimized for certain functions, such as computing or storing information.

As demand for data increases, particularly with the rise in demand of video, video-conferencing, and cloud computing, the size of data flows and associated network bandwidth may also increase. Such large data flows, also known as elephant flows may overwhelm a network with data path processing. Physical network ports and additional compute power may need to be purchased at a high cost to support a data path with numerous elephant flows.

As will be described in further detail, methods and systems are disclosed for using an SDN controller to bypass a firewall for authorized flows and to authorize flows. In this manner, fewer physical network ports and less compute power may be required to support elephant flows.

Turning now to the drawings, FIG. 1 is a block diagram showing selected elements of an embodiment of network 100. In certain embodiments, network 100 may be an Ethernet network. Network 100 may include one or more transmission media 112 operable to transport one or more signals communicated by components of network 100. The components of network 100, coupled together by transmission media 112, may include a plurality of network elements 102. In the illustrated network 100, each network element 102 is coupled to four other nodes. However, any suitable configuration of any suitable number of network elements 102 may create network 100. Although network 100 is shown as a mesh network, network 100 may also be configured as a ring network, a point-to-point network, or any other suitable network or combination of networks. Network 100 may be used in a short-haul metropolitan network, a long-haul inter-city network, or any other suitable network or combination of networks.

Each transmission medium 112 may include any system, device, or apparatus configured to communicatively couple network devices 102 to each other and communicate information between corresponding network devices 102. For example, a transmission medium 112 may include an optical fiber, an Ethernet cable, a T1 cable, a WiFi signal, a Bluetooth signal, and/or other suitable medium.

Network 100 may communicate information or "traffic" over transmission media 112. As used herein, "traffic" means information transmitted, stored, or sorted in network 100. Such traffic may comprise optical or electrical signals configured to encode audio, video, textual, and/or any other suitable data. The data may also be transmitted in a synchronous or asynchronous manner, and may transmitted deterministically (also referred to as 'real-time') and/or stochastically. In particular embodiments, traffic may be communicated via a suitable communications protocol, including, without limitation, the Internet Protocol (IP). Additionally, the traffic communicated via network 100 may be structured in any appropriate manner including, but not limited to, being structured in frames, packets, or an unstructured bit stream. The term packet may also refer to traffic communicated via network 100.

Each network element 102 in network 100 may comprise any suitable system operable to transmit and receive traffic and may provide a network service. In the illustrated embodiment, each network element 102 may be operable to transmit traffic directly to one or more other network elements 102 and receive traffic directly from the one or more other network elements 102.

Modifications, additions, or omissions may be made to network 100 without departing from the scope of the disclosure. The components and elements of network 100 described may be integrated or separated according to particular needs. Moreover, the operations of network 100 may be performed by more, fewer, or other components.

In operation, network 100 may be controlled using software defined networking (SDN) controllers, as described previously. Specifically, devices in network 100 may be configured and programmed in network 100 using various network protocols by SDN controllers. The SDN controllers may support managing authenticated data flows, as disclosed herein.

Figure 2:
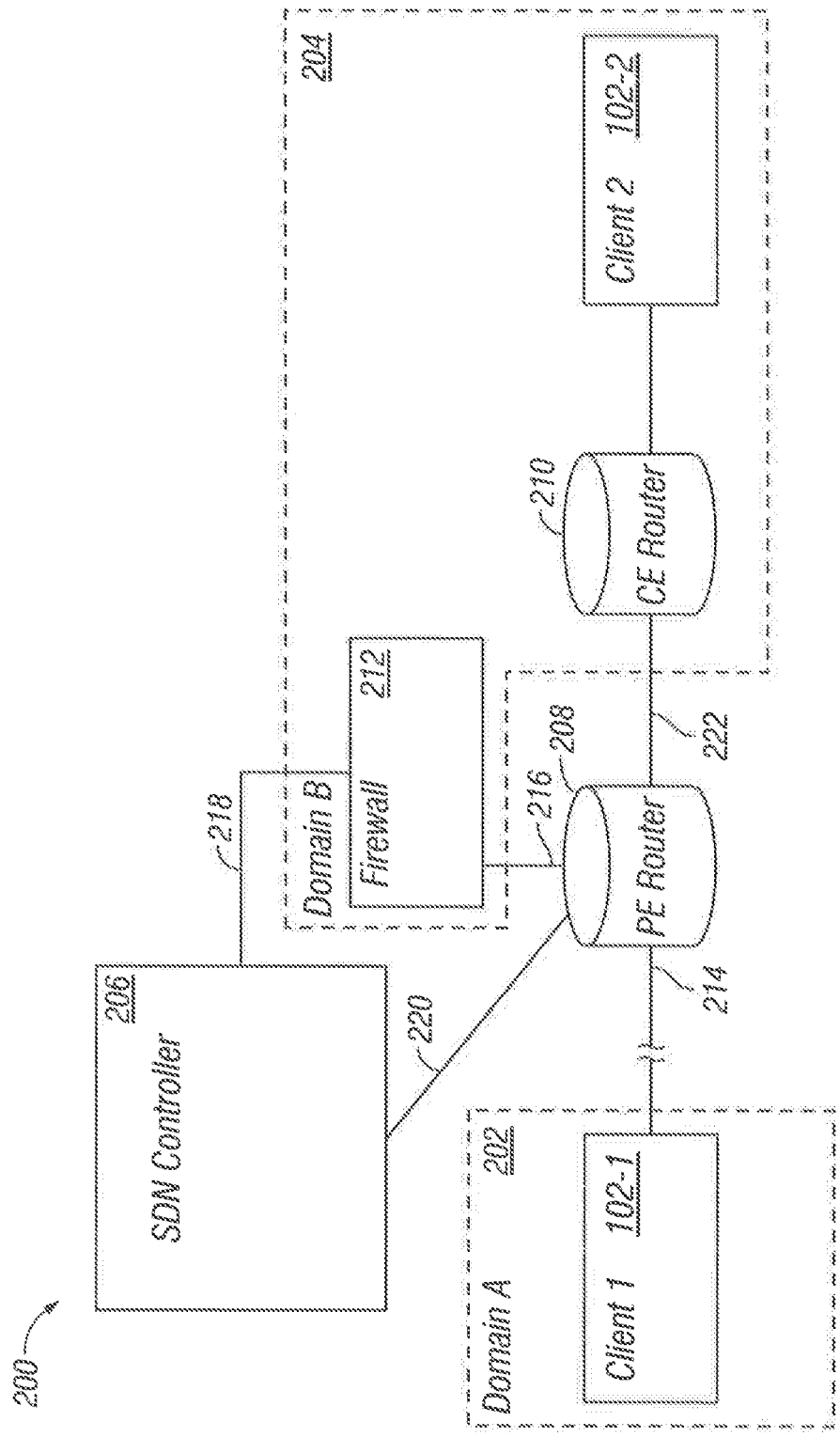
FIG. 2 is a block diagram of selected elements of a network for managing authorized data flows across domains.

Referring now to FIG. 2, a block diagram of selected elements of a network for managing authorized data flows across domains is shown in accordance with some embodiments of the present disclosure. An embodiment of a network 200 for managing authorized data flows across domains in networks, such as, for example, in transport network 100 (see FIG. 1), is illustrated.

As disclosed herein, methods and systems for managing authorized data flows across domains within a network may include two domains, which may include domain A 202 and domain B 204. Domain A 202 may include client 102-1, which may be connected to a provider edge (PE) router 208 via a link 214. Link 214 may be any suitable network connection, and may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or packets (generally referred to as data packets). PE router 208 may receive a data packet associated with a data flow from client 102-1 in domain A 202. Upon receipt, PE router 208 may check a router data flow list to determine whether the data packet matches an entry. The router data flow list may be populated with entries corresponding to authorized or validated data flows, which may be forwarded by PE router 208 toward a destination. Entries in the router data flow list may include flow criteria associated with data packets. The flow criteria may include criteria or information from the header of the data packet, which may include a source internet protocol (IP) address, a destination IP address, a destination port, and/or a protocol of the data flow. One or more of these criteria in the entry may be set to a wild-card value or may contain a range of values. A router may use the flow criteria to direct traffic in an efficient manner.

For example, the destination IP address in an entry may be set to a range of values corresponding to any destination within domain B 204. A router may then determine whether the destination IP address in a future data packet matches the defined range of values in the entry. The future data packet may be routed to domain B based on the determination that its destination IP address is within the defined range of values.

The router data flow list may be implemented using a memory, such as ternary content-addressable memory (TCAM), which may enable rapid lookup of an entry based on its value, rather than its address. Each entry in the TCAM may have a timeout and/or a rule, which enables the TCAM or PE router to invalidate, evict, delete, and/or remove entries upon expiration of the timeout, or satisfaction or violation of the rule. Using timeouts and/or rules, the TCAM may ensure that the contents of the memory remain available for use.

PE router 208 may determine whether the data packet received matches an entry. Based on the determination that the data packet does not match an entry, PE router 208 may route the data packet to an appropriate firewall for validation or authentication. A data packet that does not match an entry may be considered to be unknown or new by PE router 208. Although one firewall 212 is shown in FIG. 2, any number of firewalls, which may be associated with a client and/or domain, may be used. PE router 208 may check a default entry list to determine how to route the data packet to the appropriate firewall. For example, a data packet with a destination IP within domain B 204 may be routed to firewall 212 using link 216, which may be an IP link. Links 218 and 220 may be implemented using any suitable communication protocol, including but not limited to RESTful protocols, NETCONF, OpenFlow, SNMP, CLI, and TL1.

Firewall 212 may receive the data packet and may validate the data flow. Firewall 212 may also send flow criteria extracted from the data packet to SDN controller 206, which may use link 218. Validation may include any suitable form, including a stateless firewall or a stateful firewall. A stateless firewall may validate each traffic separately and may only validate each traffic based on the header of the traffic. A stateful firewall may validate a data flow rather than each traffic separately, and may perform the validation based on both the header of the traffic and the contents of the traffic. For example, the header and contents of the data packet may be used to validate or authorize the data packet. A stateful firewall may maintain state tables, which may include the flow criteria or any other suitable criteria, including the operation state, the application associated with the contents, the ports opened prior to receiving the data packet, and/or the sequence number of the data packet within the data flow. For example, if a client in the same domain as a firewall opens port associated with an FTP server, a stateful firewall may remember that the request to open the port originated from within the domain. A subsequent data flow from outside the domain of the firewall may be permitted based on a state table in the stateful firewall, which may track ports opened from clients within the domain.

Firewall 212 may include complex logic to properly validate or authorize data flows in an efficient manner, and may determine which data packets are acceptable for the network and which data packets are potentially harmful to the network. As the bandwidth requirements of networks increase, it may be desirable to utilize firewalls for this logic while conserving bandwidth and compute requirements using a distinct SDN controller.

Firewall 212 may include logic, which may be referred to as a policy engine. The logic may determine the flows for which flow criteria should be sent to SDN controller 206. Firewall 212 may include logic to determine whether the flow criteria was sent to SDN controller 206 within a delay or wait period. Firewall 212 may validate or authorize several data packets associated with the same data flow before the SDN controller may process the flow criteria. This delay period may account for the latency associated with the link to SDN controller 218, SDN controller 206, link to PE router 220, and/or PE router 208. The delay period may enable firewall 212 to avoid saturation of link 218 to SDN controller 206 before an authorized data flow may be managed by SDN controller 206 and PE router 208.

In one embodiment, firewall 212 may send flow criteria to SDN controller 206. In another embodiment, SDN controller 206 may poll firewall 212 for validated flow criteria. The transmission to SDN controller 206 may use link 218. The transmission may use a RESTful application programming interface (API) to facilitate communication between the firewall and SDN controller. A RESTful API may include one or more constraints, including a client-server model, a stateless model, a cacheable model, a uniform interface between clients and servers, and a layered system model. In one embodiment, the RESTful API may include each of the constraints. In another embodiment, the RESTful API may include each of the constraints and may include the ability for a server to download and execute code on a client. SDN controller 206 may receive the flow criteria and process the flow criteria. The processing may be performed by a policy engine on SDN controller 206. The policy engine may determine which flow criteria associated with a data flow may be sent to the PE router 208.

SDN controller 206 may determine whether the flow criteria matches an entry in a master data flow list of data flows. SDN controller may determine whether the flow criteria matching an entry needs to be updated. In one embodiment, the update may be based on the determination that the data flow has been encountered recently, which may use a timeout value to determine whether the data flow has been encountered before the expiration of the timeout. In another embodiment, the update may be based on the determination that the bandwidth of the data flow exceeds a threshold, which may be based on the capability of network 200, which may be defined using any suitable criteria, including but not limited to the proximity of PE router 208 to firewall 212 and client 102-2. In this case, SDN controller 206 may open or establish an additional connection between client 102-1 and client 102-2. The additional connection may bypass or skip at least one network element, such as PE router 208. The connection may be a wavelength-division multiplexing (WDM) connection, which may use fiber-optic communication and may support additional bandwidth requirements.

SDN controller 206 may include logic to determine whether the flow criteria was sent to PE router 208 within a delay or wait period. This delay period may account for the latency associated with the link 220 between SDN controller 206 and PE router 208. The delay period may enable SDN controller 206 to avoid saturation of link 220 before an authorized data flow may be managed with the assistance of PE router 208. The delay period may be less than the timeout associated with the data flow, which may ensure that the entry is not invalidated, deleted, and/or removed before the flow criteria is received and processed by PE router 208.

As described above, SDN controller 206 may communicate with PE router 208 using link 220 to direct PE router 208 to insert the flow criteria into the router data flow list. The insertion may include a timeout and/or a timestamp. The router data flow list may be used for future data packets associated with the same data flow as the original data packet to forward the future data packets toward a destination. For example PE router 208 may use the router data flow list to forward a future data packet to customer-edge (CE) router 210 using link 222, rather than routing the data packet to firewall 212. Bypassing firewall 212, in this instance, may reduce the network bandwidth required and/or reduce the number of physical ports required on firewall 212 and/or PE router 208. Firewall 212, for instance, may be located in a location separate from one or more domains in the network, which may increase the latency of authenticating a data packet. Bypassing firewall 212 may reduce the latency and may decrease the bandwidth requirements of the network. A data packet routed to CE router 210 may then be routed toward client 102-2, which may be the destination of a communication with client 102-1.

Although, SDN controller 206 is shown as communicating with PE router 208, SDN controller may communicate with any number of routers within network 100 using any number of links 112. Moreover, although two domains are shown, any number of domains may be used.

Figure 3:
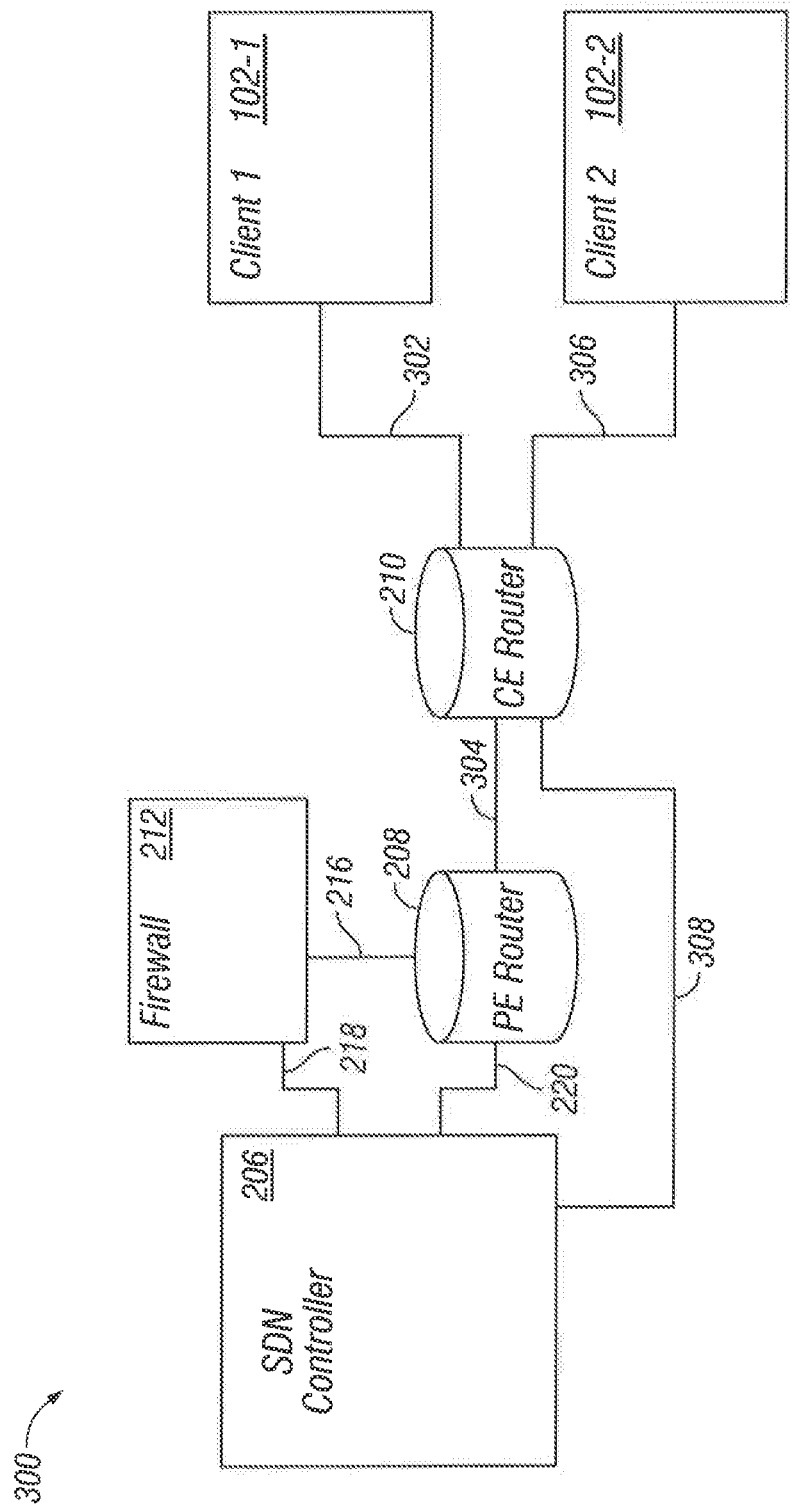
FIG. 3 is a block diagram of selected elements of a network for managing authorized data flows within a domain.

Referring now to FIG. 3, another embodiment of a network for managing authorized data flows is shown in accordance with the present disclosure. While FIG. 2 illustrates a network for managing authorized data flows between two clients located in two different domains, FIG. 3 illustrates a network for managing authorized data flows between two clients within the same domain.

As disclosed herein, methods and systems for managing authorized data flows within a domain in a network may include two or more clients 102-1 and 102-2. The clients may be connected to CE router 210 using links 302 and 306. CE router 210, links 302 and 306, and clients 102-1 and 102-2 may be within the same domain. CE router 210 may receive a data packet from a client and determine whether the data packet is unknown or new. This determination may involve matching flow criteria from the data packet to an entry in a router data flow list. The router data flow list may be implemented using a TCAM. CE router 210 may send the data packet to PE router 208 over link 304 based on the determination that the flow criteria from the data packet does not match an entry in the router data flow list.

PE router 208 may also receive the data packet and may determine whether the data packet is unknown or new. This determination may include matching flow criteria from the data packet to entry in the PE router data flow list. PE router 208 may also send the data packet to an appropriate firewall using a default flow entry list. For instance, firewall 212 may receive the data packet from PE router 208 using link 216. Links 218, 220, and 308 may be implemented using any suitable communication protocol for flow criteria, including but not limited to RESTful protocols, NETCONF, OpenFlow, SNMP, CLI, and TL1. Links 302, 306, 304, and 216 may be implemented using any suitable communication protocol for data packets, including but not limited to an IP link.

SDN controller 206 may be connected to firewall 212, PE router 208, and CE router 210. SDN controller 206 may send the flow criteria associated with a data flow, validated or authorized by firewall 212, to PE router 208 or CE router 210. The CE router may insert the received flow criteria in a router data flow list to forward future data packets from a client directly to a destination within the same domain. For example, client 102-1 may send a future data packets associated with a data flow to client 102-2 via CE router 210 while bypassing PE router 206 and/or firewall 212. Accordingly, SDN controller 206 may manage authorized data flows, which may reduce the bandwidth requirements of network 300 and/or reduce the number of network ports on CE router 210, PE router 208, and/or firewall 212.

Figure 4:
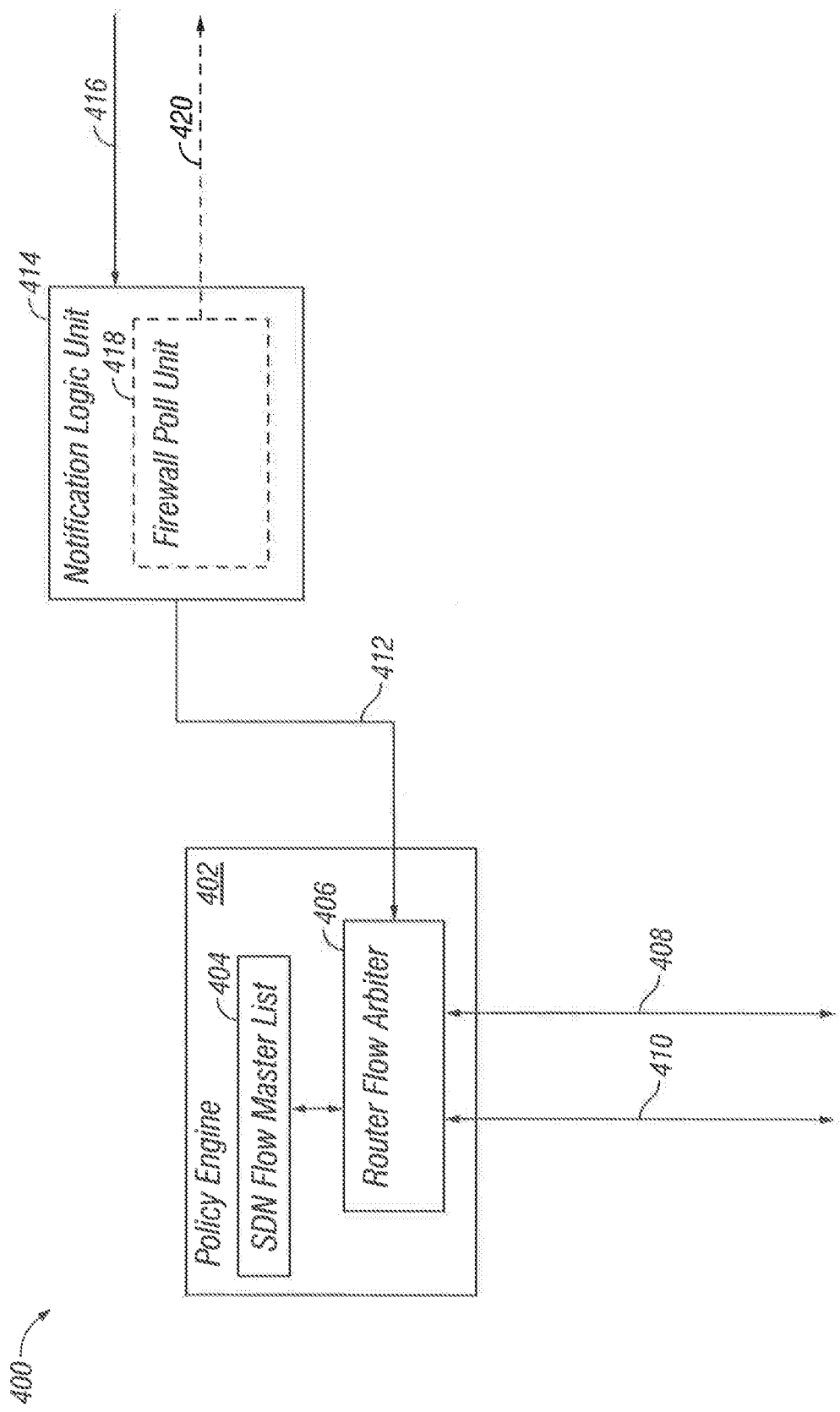
FIG. 4 is a block diagram of selected elements of a software defined networking controller for managing authorized data flows.

Referring now to FIG. 4, a block diagram of selected elements of a software defined networking (SDN) controller 400 for managing authorized data flows is shown in accordance with some embodiments of the present disclosure. SDN controller 400 may include policy engine 402 and/or notification logic unit 414. SDN controller 206 may be implemented, in whole or in part, by SDN controller 400.

Notification logic unit 414 may include a link 416 to a firewall for validating data flows. Notification logic unit 414 may receive flow criteria from a firewall, and may send the flow criteria to the policy engine using link 412. Notification logic unit 414 may also include a firewall poll unit 418, which may query or poll a firewall using link 420. Firewall poll unit 418 may be enable SDN controller 400 to interface with legacy firewalls, which may not be configured to send flow criteria to an SDN controller. Firewall poll unit 418 may poll a firewall periodically to determine whether any data flows were recently validated. For example, firewall poll unit 418 may communicate via link 420 with a firewall every one millisecond to determine whether any additional data flows were validated or authorized with an unknown or new data packet. The firewall may respond to the poll with the flow criteria associated with the validated data packet. Notification logic unit 414 may forward this flow criteria to policy engine 402.

Policy engine 402 may include SDN flow master list 404 and/or router flow arbiter 406. The SDN flow master list, also known as the master data flow list, may include entries of flow criteria associated with authorized data flows. In one embodiment, each entry of the master data flow list 404 may include a timeout, which may indicate how long the data flow is estimated to be active. The timeout may be set based on the type of data flow. For example, a data flow associated with a messaging application, such as e-mail communications, may receive a shorter timeout than a video application. The messaging application may involve less frequent transmissions than the video application, which may be characterized as an elephant data flow. In another embodiment, each entry may also be associated with a timestamp, which may indicate when the entry was last inserted or updated in the master data flow list. Master data flow list 404 may communicate with router flow arbiter 406 to send flow criteria associated with authorized data flows to one or more routers. For example, links 408 and 410 may connect with two routers, which may also use these links to indicate to SDN controller 400 that the free entry count, or the number of free entries at the router is equal to or less than a threshold. Router flow arbiter 406 may also delay sending flow criteria to a router if the same flow criteria was previously sent to the same router within a delay or wait period. In this case, router flow arbiter 406 may not send any communication to the router to account for the latency of the link to the router and the router's ability to respond to a future data packet. In one embodiment, the flow criteria may be inserted into a queue. In another embodiment, the flow criteria may not be retained or discarded, and data packets associated with the data flow may be processed and forwarded normally until the wait period has expired. Although two links are shown, any number of links connected to any number of routers may be used.

Figure 5:
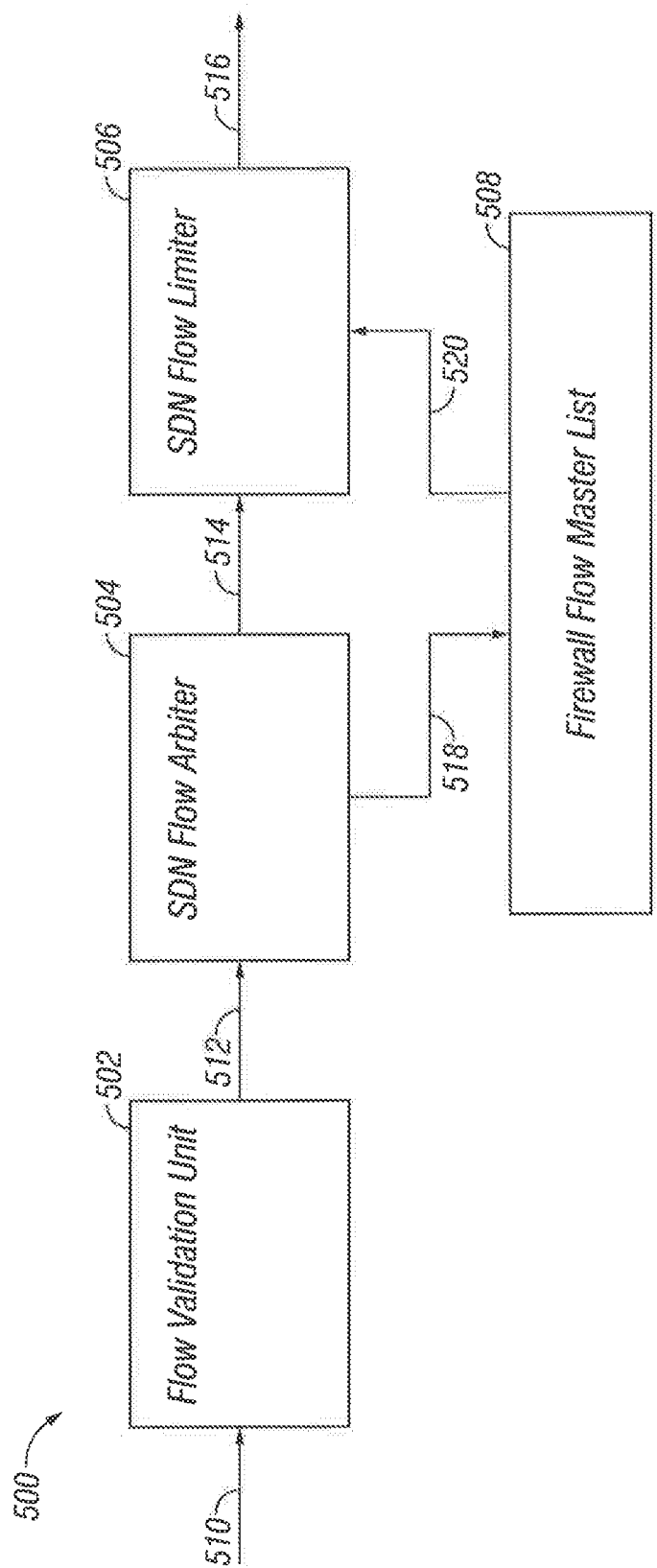
FIG. 5 is a block diagram of selected elements of a firewall for supporting management of authorized data flows.

Referring now to FIG. 5, a block diagram of selected elements of firewall 500 for supporting management of authorized data flows is shown in accordance with some embodiments of the present disclosure. Firewall 212 may be implemented, in whole or in part, by firewall 500, and may interface with SDN controller 206 and PE router 208. Firewall 500 may include an input link 510 from a router. Input link 510 may receive data packets associated with data flows unknown or new to the router. Firewall 500 may include flow validation unit 502, SDN flow arbiter 504, firewall flow master list 508, and SDN flow limiter 506. Flow validation unit 502 may validate the data packet associated with the data flow unknown to the router. In one embodiment, validation may include inspection of the header of the data packet. In another embodiment, validation may include inspection of the header and the contents of the data packet. Validation may be performed by a stateless or a stateful firewall design.

SDN flow arbiter 504 may communicate with firewall flow master list 508 over link 518, and may communicate with SDN flow limiter 506 over link 514. SDN flow arbiter 504 may determine whether a data flow was recently forwarded to an SDN controller with a delay or wait period. The delay or wait period may account for the latency of the link 516 to the SDN controller, the SDN controller, and/or any subsequent links from the SDN controller. SDN flow arbiter 504 may also send the flow criteria to a firewall flow master list to determine whether the flow criteria matches an entry. A timestamp associated with the entry may be found based on a matching entry. The timestamp may be compared to a current timestamp to determination whether the flow criteria was recently inserted or updated in the list. Firewall flow master list 508 may communicate with SDN flow limiter 520 to avoid saturation of link 516 to an SDN controller and/or any other portion of the network. Although flow validation unit 502, SDN flow arbiter 504, SDN flow limiter 506, and firewall flow master list 508 are shown in communication in order, the elements of firewall 500 may be connected in any order suitable to validate unknown data flows and/or reduce the likelihood of network saturation.

Figure 6:
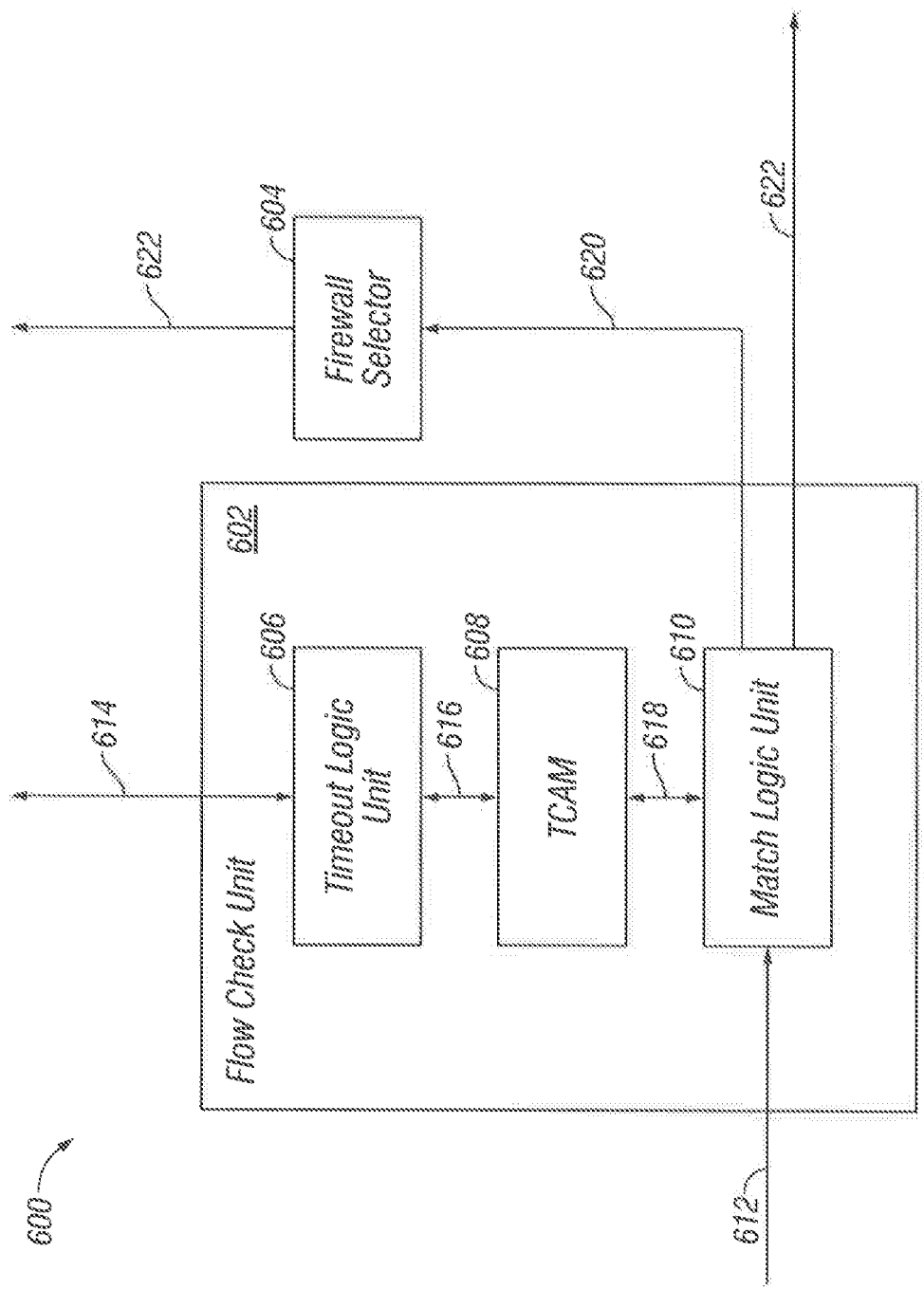
FIG. 6 is a block diagram of selected elements of a router for managing authorized data flows.

Referring now to FIG. 6, a block diagram of selected elements of a router 600 for managing authorized data flows is shown in accordance with some embodiments of the present disclosure. PE router 208 may be implemented, in whole or in part, by router 600, and may interface with firewall 212 and SDN controller 206. Router 600 may include an input 612 from a domain and/or a client. Router 600 may also include an output 622 to another client and/or domain. Although an input 612 and output 622 are shown, router 600 may include bi-directional communication in which an input is also an output, and an output is also an input.

Router 600 may include flow check unit 602 to determine whether a data packet is associated with an unknown or new data flow. Flow check unit 602 may include match logic unit 610, TCAM 608, and timeout logic unit 606. Match logic unit 610 may interface with incoming data flows to determine whether the flow criteria in the data packet matches an entry in TCAM 608. TCAM 608 may enable the lookup of information using the data or contents, rather than the address of the data. TCAM 608 may include limited entries to facilitate the match logic unit performance. Accordingly, TCAM 608 may rely on timeout logic unit 606 to invalidate, delete, and/or remove entries to maintain performance. In one embodiment, entries in TCAM 608 have associated timeouts. In this case, entries may be invalidated, deleted, and/or removed when the entry has remained in the TCAM for the duration of the timeout without any use. In another embodiment, entries in TCAM 608 have associated timestamps, in which the entries may be invalidated, deleted, and/or removed when the difference between the current timestamp and the timestamp associated with the entry is equal to or greater than a threshold. Timeout logic unit 606 may interface with an SDN controller over link 614 to insert and update entries in TCAM 608. Although timeout logic unit 606 and match logic unit 610 are shown as within flow check unit 602, these units may be embedded with TCAM 608.

Router 600 may also include a firewall selector 604, which may include a default entry list, which may provide default routing information for data packets based on flow criteria. For example, a data packet with a particular destination IP address may be routed using the default routing information to a particular firewall. Although firewall selector 604 is connected to a firewall via link 622, any number of firewalls and/or any number of links suitable for a router may be used.

Figure 7:
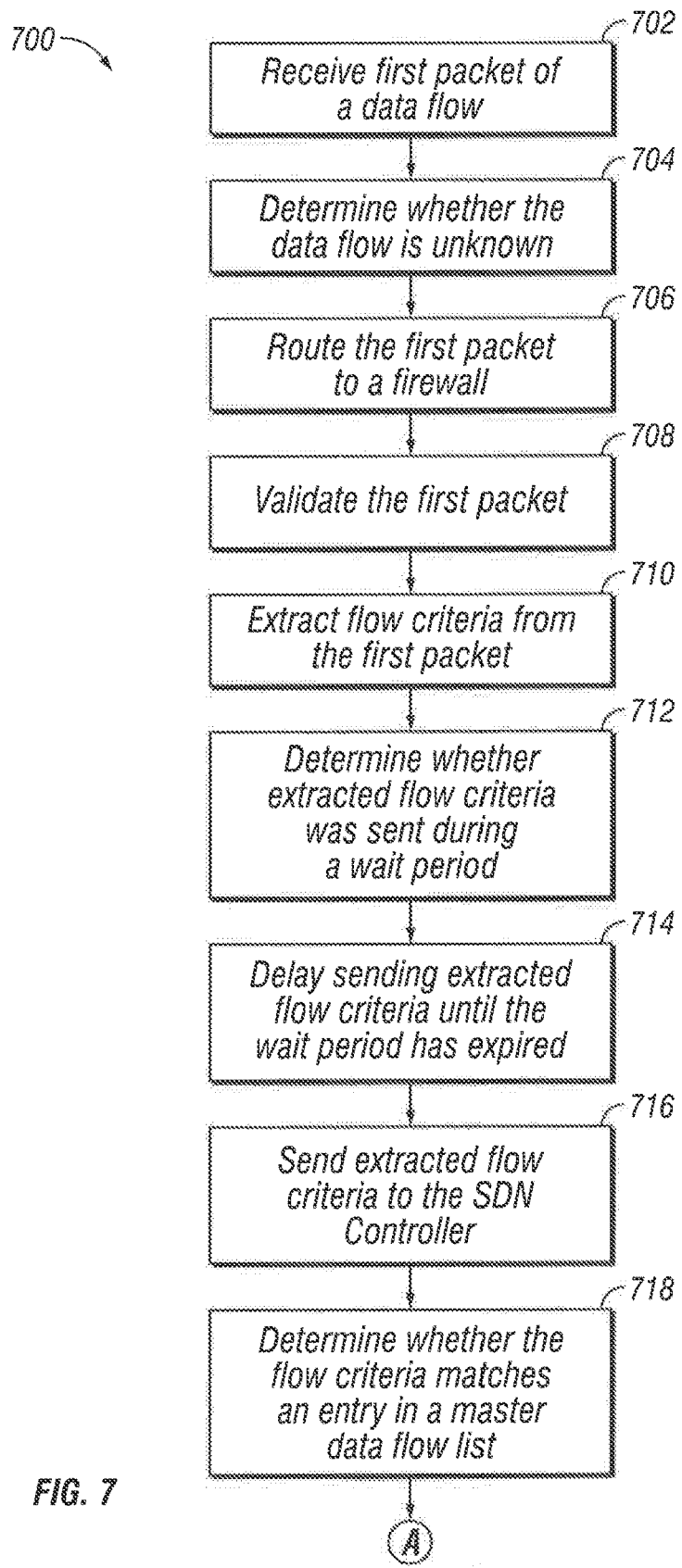
FIG. 7 is a flow chart of selected elements of a method for managing authorized data flows.
Figure 7:
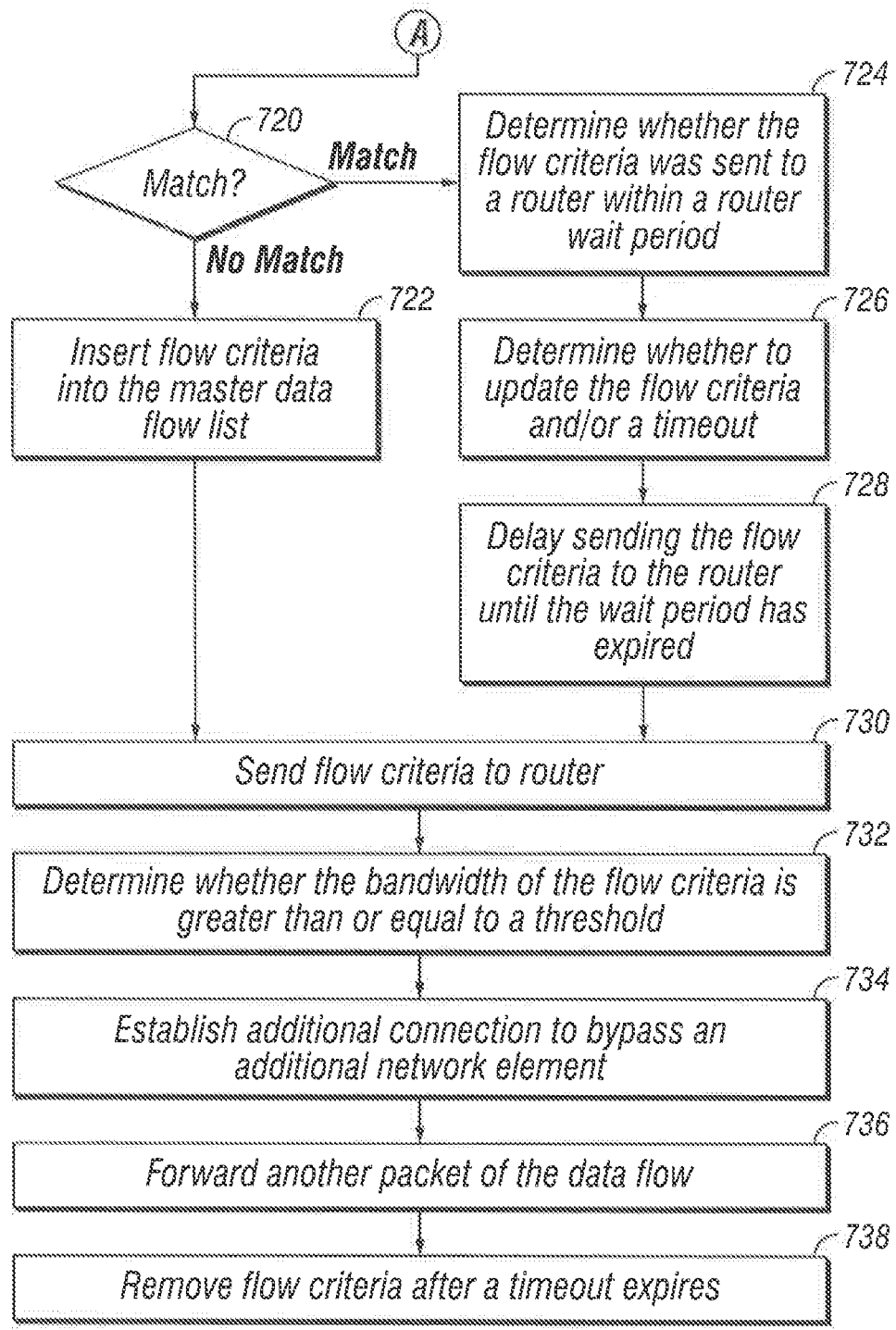

Referring now to FIG. 7, a flow chart of selected elements of a method 700 for managing authorized data flows is shown in accordance with some embodiments of the present disclosure. Method 700 may be implemented by any of the elements shown in FIGS. 1-6. Method 700 may be initiated by any suitable criteria and may initiate operation at any suitable point. In one embodiment, method 700 may initiate operation at 702. Method 700 may include greater or fewer steps than those illustrated. Moreover, method 700 may execute its steps in an order that is different than those illustrated below. Method 700 may terminate at any suitable step. Moreover, method 700 may repeat operation at any suitable step. Portions of method 700 may be performed in parallel and repeat with respect to other portions of method 700.

At 702, a first packet of a data flow may be received. The first packet may be received by a router, such as a PE router or a CE router. At 704, it may be determined whether the data flow is unknown or new. The router may make this determination, which may include determining whether flow criteria extracted from the data flow matches an entry in a router data flow list. The extraction may be performed by a match logic unit within the router. The router data flow list may be implemented using a data memory or a data cache, such as a content-addressable memory (CAM) or a TCAM.

At 706, the first data packet may be routed to a firewall. The routing may be determined by a default flow entry list, which may facilitate the routing of data packets to two or more firewalls communicatively coupled to the router. The connection between the router and the firewall may be of any suitable type for data packets, including but not limited to an IP link. At 708, the first data packet may be validated or authorized. The validation or authorization may be performed by the firewall, which may include logic tailored for identification and validation of a data flow to protect a network. The firewall may be a stateless firewall or a stateful firewall. A stateless firewall may validate each traffic or data packet separately and may only validate each traffic based on the header of the traffic. A stateful firewall may validate a data flow rather than each traffic separately, and may perform the validation based on both the header of the traffic and the contents of the traffic.

At 710, flow criteria may be extracted from the first data packet. The flow criteria may include flow criteria 800 as described below. At 712, it may be determined whether the extracted flow criteria was sent during a wait or delay period. The wait or delay period may account for the latency of sending and/or processing of the flow criteria before a subsequent data packet associated with the same data flow is processed. At 714, sending of extracted flow criteria may be delayed until the wait period has elapsed. In one embodiment, the pending transmission may be placed in a queue. In another embodiment, the data packets associated with the data flow may be processed and forwarded normally, and the flow criteria may not be retained. At 716, the extracted flow criteria may be sent to an SDN controller from a firewall. The SDN controller may be include hardware, software, and/or firmware with logic to manage authorized data flows, including bypassing the firewall. The firewall may communicate with the SDN controller using a RESTful API. At 718, it may be determined whether the flow criteria matches an entry in a master data flow list. The match may be a partial match, which may include matching a wild-card value or a range of values for a component of the extracted flow criteria.

At 720, an evaluation for a match may occur. If no match is found, method 700 may proceed to 722. Otherwise, a match is found and method 700 may proceed to 724. At 722, the flow criteria may be inserted into the master data flow list. The master data flow list may be managed by the SDN controller. The flow criteria inserted into the master data flow list may be associated with a timestamp. The timestamp may correspond to the time at which the data packet was received, the time at which the data packet was inserted, or any other suitable time for processing the data packet. The timestamp may include a date and/or a time. Moreover, the flow criteria inserted into the master data flow list may be associated with a timeout. The timeout may indicate the duration to maintain the flow criteria as an entry in the master data flow list. After the expiration of the timeout, the entry may be invalidated, deleted, and/or removed.

At 724, it may be determined whether the flow criteria was sent to a router within a router wait or delay period. The router delay period may account for latency in transmission or processing of the flow criteria. At 726, it may be determined whether to update the flow criteria and/or timeout in the master data flow list. The timeout, for instance, may be incremented if the flow criteria is repeatedly encountered within a period of time. The period may be defined by the bandwidth requirements of the associated data flow and/or the bandwidth capability of the network. At 728, the sending of flow criteria to the router may be delayed until the wait period has expired. In one embodiment, the delay may be implemented using a queue. In another embodiment, the data packets associated with the data flow may be processed and forwarded normally, and the flow criteria may not be retained or may be discarded, while the matching entry may be maintained.

At 730, the flow criteria may be sent to a router from the SDN controller. The flow criteria received from a router may be used to update the router flow table. At 732, it may be determined whether the bandwidth of the flow criteria is greater than or equal to a threshold. The threshold may be determined based on the capacity of the network. At 734, an additional connection may be established. The additional connection, which may be a WDM connection, may enable an authorized data flow to bypass at least one additional network element. At 736, another data packet associated with the same data flow may be received and may be forwarded toward a destination. The forwarding may include bypassing at least one network element, including but not limited to a router and/or a firewall. At 738, the flow criteria may be removed, invalidated, or deleted after the timeout associated with the flow criteria entry expires. The expiration may influence the storage of the flow criteria in the firewall, router, and/or SDN controller.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing authorized data flows using a software defined networking controller, the method comprising:

receiving, at the software defined networking controller, flow criteria sent from a firewall and extracted from a first data packet associated with a data flow from a router, wherein the flow criteria does not match an entry in a router data flow list on the router and the flow criteria includes at least two of:

a source IP address;

a destination IP address;

a destination port; and a protocol of transmission;

determining, by the software defined networking controller, whether the flow criteria from the first data packet matches an entry in a master data flow list on the software defined networking controller;

inserting the flow criteria from the first data packet into the master data flow list on the software defined networking controller based on the determination that the flow criteria does not match an entry; and sending the flow criteria of the first data packet from the software defined networking controller to the router to forward a second data packet associated with the data flow toward a destination based on the validation of the first data packet by the firewall.

2. The method of claim 1, wherein the step of inserting the flow criteria further comprises inserting a timestamp associated with the flow criteria into the master data flow list.

3. The method of claim 1, further comprising determining a timeout for the flow criteria and the step of sending the flow criteria to the router further comprises sending the timeout.

4. The method of claim 1, further comprising:

receiving at the software defined networking controller flow criteria sent from the firewall and extracted from a third data packet associated with the data flow from the router, wherein the third data packet is received by the router before the second data packet;

determining whether the flow criteria of the third data packet was sent to the router within a router wait period; and discarding the flow criteria of the third data packet based on a determination that the flow criteria of the third data packet matches an entry in the master data flow list on the software defined networking controller and the determination that the flow criteria of the matching entry was sent to the router within the router wait period.

5. The method of claim 1, further comprising sending the flow criteria of the first data packet from the software defined networking controller to a second router, the second router to receive the second data packet associated with the data flow and send the second data packet toward the destination.

6. The method of claim 1, further comprising:
determining whether a bandwidth of the data flow is greater than or equal to a threshold; and
establishing an additional connection to bypass an additional network element for the data flow based on the determination that the bandwidth of the data flow is greater than or equal to a threshold.

7. The method of claim 1, further comprising:
receiving flow criteria extracted from a third data packet associated with the data flow, wherein the flow criteria extracted from the first data packet and the third data packet use a RESTful interface;
determining whether the flow criteria from the third data packet matches an entry in the master data flow list; and
updating the entry based on the determination that the flow criteria from the third data packet matches the entry.

8. The method of claim 7, wherein the step of updating further comprises at least one of:
updating a timestamp associated with the matching entry in the master data flow list;
increasing a timeout associated with the matching entry in the master data flow list; and
setting the destination IP address to at least one of: a wild-card value and a range of values.

9. The method of claim 7, further comprising sending flow criteria from the updated entry to the router.

10. The method of claim 3, wherein the step of determining a timeout for the flow criteria is based on a type of application associated with the flow criteria.

11. A network for managing authorized data flows comprising:
a router with logic to:
receive a first data packet;
extract flow criteria from the first data packet, the flow criteria comprising at least two of:
a source IP address;
a destination IP address;
a destination port; and
a protocol of transmission;
determine whether the flow criteria matches an entry in a router data flow list;
route the first data packet to a firewall based on the determination that the flow criteria does not match an entry in the router data flow list;
the firewall with logic to:
validate the first data packet;
send the first data packet toward a destination;
send the flow criteria to a software defined networking controller; and
the software defined networking controller with logic to:
determine whether the flow criteria matches an entry in a master data flow list on the software defined networking controller;
insert the flow criteria into the master data flow list on the software defined networking controller based on the determination that the flow criteria does not match an entry; and
send the flow criteria to the router to forward a second data packet associated with the data flow toward a destination based on validation of the first data packet by the firewall.

12. The network of claim 11, wherein the logic to insert the flow criteria into the master data flow list further comprises logic to insert a timestamp associated with the flow criteria.

13. The network of claim 11, wherein the software defined networking controller further comprises logic to determine a timeout for the flow criteria and the logic to send the flow criteria to the router further comprises logic to send the timeout.

14. The network of claim 11, wherein the software defined networking controller further comprises logic to:
receive at the software defined networking controller flow criteria sent from the firewall and extracted from a third data packet associated with the data flow from the router;
determine whether the flow criteria of the third data packet was sent to the router within a router wait period; and
discard the flow criteria of the third data packet based on a determination that the flow criteria of the third data packet matches an entry in the master data flow list on the software defined networking controller and the determination that the flow criteria of the matching entry was sent to the router within the router wait period.

15. The network of claim 11, wherein software defined networking controller further comprises logic to send the flow criteria of the first data packet to a second router, the second router to receive the second data packet associated with the data flow and to send the second data packet toward the destination.

16. The network of claim 11, wherein the software defined networking controller further comprises logic to:
determine whether a bandwidth of the data flow is greater than or equal to a threshold; and
establish an additional connection to bypass an additional network element for the data flow based on the determination that the bandwidth of the data flow is greater than or equal to a threshold.

17. The network of claim 11, wherein the software defined networking controller further comprises logic to:
receive flow criteria extracted from a third data packet associated with the data flow, wherein the logic to receive the flow criteria extracted from the first data packet and third data packet uses a RESTful interface;
determine whether the flow criteria from the third data packet matches an entry in the master data flow list; and
update the entry based on the determination that the flow criteria from the third data packet matches an entry.

18. The network of claim 17, wherein the logic to update the flow criteria further comprises at least one of:
updating a timestamp associated with the matching entry in the master flow data list;
increasing a timeout associated with the matching entry in the master data flow list; and
setting the destination IP address to at least one of: a wild-card value and a range of values.

19. The network of claim 17, wherein the software defined networking controller further comprises logic to send flow criteria from the updated entry to the router.

20. The network of claim 13, wherein the logic to determine a timeout for the flow criteria is based on a type of application associated with the flow criteria.

* * * * *